United States Patent [19]
> Barth et al.

[11] 4,163,752

[45] Aug. 7, 1979

[54] PROCESS FOR THE PREPARATION OF AMINONAPHTHALENESULPHONIC ACIDS

[75] Inventors: Otto Barth, Bergisch-Gladbach; Hans-Joachim Becker, Leverkusen; Horst Behre, Odenthal; Reinhard Kaiser, Cologne; Guido Steffan, Odenthal; Jürgen Zander, Leverkusen, all of Fed. Rep. of Germany

[73] Assignee: Bayer Aktiengesellschaft, Leverkusen, Fed. Rep. of Germany

[21] Appl. No.: 868,558

[22] Filed: Jan. 11, 1978

[30] Foreign Application Priority Data

Jan. 26, 1977 [DE] Fed. Rep. of Germany ....... 2703076
Oct. 25, 1977 [DE] Fed. Rep. of Germany ....... 2747714

[51] Int. Cl.$^2$ ............................................. C07C 143/56
[52] U.S. Cl. .................................................... 260/508
[58] Field of Search ........................................ 260/508

[56] References Cited

FOREIGN PATENT DOCUMENTS 1499589  2/1978  United Kingdom ..................... 260/508

*Primary Examiner*—A. Siegel
*Attorney, Agent, or Firm*—Sprung, Felfe, Horn, Lynch & Kramer

[57] ABSTRACT

A process has been invented for the preparation of aminonaphthalenesulphonic acids by the catalytic hydrogenation of salts of nitronaphthalenesulphonic acids with hydrogen in the presence of Raney nickel catalysts at elevated temperature and pressure, said catalysts comprising a combination of fresh Raney nickel catalyst and Raney nickel catalyst which has already been used in prior hydrogenation or hydrogenations.

18 Claims, No Drawings

PROCESS FOR THE PREPARATION OF AMINONAPHTHALENESULPHONIC ACIDS

The invention relates to a process for the preparation of aminonaphthalenesulphonic acids from nitronaphthalenesulphonic acids by catalytic hydrogenation.

It is known to prepare an aromatic aminosulphonic acid from an aromatic nitrosulphonic acid by contacting an aqueous solution of the latter with hydrogen, carbon monoxide or a mixture thereof in the presence of a catalyst consisting of pairs of heavy metals, such as silver and manganese; copper and cerium; copper and manganese; or iron and manganese, which can be present in the form of their oxides, hydroxides or carbonates or in some cases in the form of reduction products thereof (DT-OS (German Published specification) 1,810,827). The low space/time yields, for example, are a disadvantage of this process.

Furthermore, it is known to prepare aminonaphthalene-1,5- and -1,8-disulphonic acids from the corresponding nitro compounds by reduction with hydrogen or mixtures of carbon monoxide and hydrogen or sulphur dioxide, in the presence of nickel, cobalt, copper or iron, which can also be used in the form of their oxides (French Patent specification No 560,318). This process has the disadvantage that it apparently gives poor hydrogenation yields and low space/time yields.

It is known, from Japanese Offenlegungsschrift (Japanese Published Specification) 127,956/74, to prepare aminonaphthalenesulphonic acids from nitronaphthalenesulphonic acids by catalytic reduction with hydrogen in the presence of Raney nickel at temperatures of 60° to 200° C. and under elevated pressure in an aqueous medium with a pH value of 8 to 12.

The profitability of this process is considerably restricted by the moderate hydrogenation yield, low space/time yield and high catalyst consumption from the point of view of modern hydrogenations. In addition, the process operates discontinuously, which is associated with a greater technical effort.

A process has now been found for the preparation of aminonaphthalenesulphonic acid by the catalytic hydrogenation of salts of nitronaphthalenesulphonic acids with hydrogen in the presence of Raney nickel catalysts at elevated temperature and under elevated pressure, which is characterised in that a mixture of Raney nickel catalyst which has already been used in the hydrogenation and fresh Raney nickel catalyst is initially suspended in water and/or in an aqueous solution of hydrogenated product, this suspension is heated to a temperature of about 100° to 180° C. under a hydrogen pressure of about 100 to 300 bars and an aqueous solution or suspension of nitronaphthalenesulphonic acids with a pH-value in the range from about 6 to 9 is metered into the suspension at this temperature in a manner such that the content of nitronaphthalenesulphonic acids in the reaction mixture does not exceed 3%, relative to the total weight of the reaction mixture and such that the concentration of aminonaphthalenesulphonic acid which is finally reached is about 5 to 40% relative to the total weight of the reaction mixture.

All the nitronaphthalenemonosulphonic acids, disulphonic acids and trisulphonic acids can be employed in the process according to the invention. They can be employed individually or in mixtures. It is not important here whether the sulphonic acids are present in the pure form or as a crude material. For example, an isomer mixture of nitronaphthalenetrisulphonic acids, such as is formed in the trisulphonation of naphthalene and subsequent nitration of the naphthalenetrisulphonic acid mixture according to Fiat Final Report 1016, page 37, can be employed in the process according to the invention. The isomer mixture prepared in this manner consists of about 80 to 82% by weight of 1-nitronaphthalene-3,6,8-trisulphonic acid (nitro-T-acid), about 11 to 12% by weight of 1-nitro-naphthalene-3,5,7-trisulphonic acid, about 4.5% by weight of 1-nitro-naphthalene-4,6,8-trisulphonic acid, about 1.7% by weight of 1-nitro-naphthalene-2,5,7-trisulphonic acid, about 1% by weight of 2-nitro-naphthalene-3,5,7-trisulphonic acid and about 0.5% by weight of 2-nitronaphthalene-4,6,8-trisulphonic acid.

Furthermore, as mentioned above, nitronaphthalenemonosulphonic acid, such as 1-nitronaphthalene-5-sulphonic acid (nitro-Laurent acid), 1-nitronaphthalene-8-sulphonic acid (nitro-peri-acid), 5-nitronaphthalene-2-sulphonic acid and 5-nitronaphthalene-3-sulphonic acid; nitronaphthalenedisulphonic acids, such as 3-nitronaphthalene-1,5-disulphonic acid, 1-nitronaphthalene-4,8-disulphonic acid and 1-nitro-naphthalene-3,8-disulphonic acid; and nitronaphthalenetrisulphonic acids, such as 1-nitronaphthalene-3,6,8-trisulphonic acid, 1-nitronaphthalene-4,6,8-trisulphonic acid, 1-nitronaphthalene-3,5,7-trisulphonic acid, 1-nitro-naphthalene-2,5,7-trisulphonic acid, 2-nitronaphthalene-3,5,7-trisulphonic acid and 2-nitronaphthalene-4,6,8-trisulphonic acid can be employed in the process according to the invention. Particularly preferred are 1-nitronaphthalene-5-sulphonic acid, 1-nitronaphthalene-8-sulphonic acid, 3-nitronaphthalene-1,5-disulphonic acid, 1-nitroapthalene-4,8-disulphonic acid, 1-nitronaphthalene-3,8-disulphonic acid, 1-nitronaphthalene-3,6,8-trisulphonic acid and/or 1-nitronaphthalene-3,5,7-trisulphonic acid.

In this process, the abovementioned mixture of nitronaphthalenetrisulphonic acids obtained according to Fiat Final Report 1016, page 37 or pure 1-nitronaphthalene-3,6,8-trisulphonic acid or a mixture or 5- and 8-nitronaphthalene-1-sulphonic acid or pure 3-nitronaphthalene-1,5-disulphonic acid are preferably employed.

The nitronaphthalenesulphonic acids are preferably used in the form of their sodium salts, potassium salts, ammonium salts, magnesium salts and/or calcium salts, which are readily or moderately water-soluble.

The nitro-naphthalenesulfonic acids, especially the 1-nitronaphthalene-3,6,8-trisulfonic acid, are preferably used in the form of their calcium salts, sodium salts and/or potassium salts. These salts can be prepared, for example, as follows: The reaction mixture which is obtained after the sulphonation of naphthalene and after the subsequent nitration of the sulphonation product is treated with chalk (chalking), the calcium salts of the nitro-naphthalenesulfonic acids being formed and sulphuric acid being obtained as gypsum and the gypsum being removed. In such manner calcium salts are obtained. After adding sufficient sodium carbonate or potassium carbonate to the resulting reaction solution at elevated temperature in order to precipitate all the calcium as calcium carbonate the sulphonic acids are, thus, provided in the form of their sodium or potassium salts. After filtering off the calcium carbonate, the solution can be employed directly for the hydrogenation. The 3-nitronaphthalene-1,5-disulfonic acid is preferably used in the form of its sodium salt and/or magnesium salt. These salts can be prepared, for example, as follows: By adding sodium carbonate or magnesium carbonate, the disodium salt or magnesium salt of 3-nitronaphthalene-1,5-disulphonic acid, prepared from pure naphthalene-1,5-disulphonic acid, for example according to German Pat. No. 65,997, is precipitated directly from the nitration mixture, diluted with water, and is filtered off and washed with sodium chloride solution. These salts can be employed for the hydrogenation in the form of an aqueous suspension, which is rendered to the derived pH value by adding sodium carbonate. The 1-nitronaphthalene-5-sulfonic acid and the 1-nitronaphthalene-8-sulfonic acid are preferably used in the form of their magnesium salts and/or ammonium salts. These salts can be prepared, for example, as follows: The reaction mixture obtained, for example, according to PB Report No. 74197 after sulfonation of naphthalene followed by nitration of the sulfonation product is treated with magnesium carbonate or ammonium carbonate and calcium carbonate. The gypsum which precipitates is removed. In such manner solutions of magnesium salts or ammonium salts of 1-nitronaphthalene-5- or -8-sulfonic acid are obtained.

The hydrogenation of the sodium salts, potassium salts, ammonium salts, magnesium salts and/or calcium salts of the nitronaphthalene sulphonic acids can be advantageously carried out in water. However, it is also possible to employ mixtures of water and alcohol as the solvent. Suitable alcohols have proved to be, for example, alkanols having 1 to 4 carbon atoms, such as methanol, ethanol, propanol, isopropanol and tert.-butanol. It has proved favourable to use mixtures of water and alcohol which have a weight ratio of water to alcohol of about 1:2 to 2:1, preferably about 1:1.

In order to achieve economic rates of hydrogenation (for example a solution throughput of 5 to 15 l per 1 liter of reactor volume and hour and a space/time yield of 1 to 3 kg of amine per 1 liter of reactor volume and hour), it is essential, in the process according to the invention, that the mixture to be hydrogenated has a pH value in the range from 6 to 9, pH values in the range from 7 to 8 being preferred. For corrosion reasons, a pH value below 6 is unfavourable, and at a pH value above 9 the hydrogenation proceeds too slowly. The lower yields are obtained, as Example 9 shows.

The hydrogenation can be carried out in a temperature range from about 100° to 180° C. The hydrogenation is advantageously carried out at temperatures of about 130° to 160° C. The hydrogen pressure in the process according to the invention should be about 100 to 300 bars. A hydrogen pressure of about 150 to 200 bars has proved favourable.

Raney nickel catalysts can be used as catalysts for the hydrogenation within the scope of the process according to the invention. The Raney nickel can optionally be alloyed here with other metals, such as molybdenum, titanium, aluminium, vanadium, magnesium or chromium. A Raney nickel catalyst which is alloyed with iron is preferably employed in the process according to the invention. It is advantageous here if the ratio of the parts by weight of nickel to iron is about 85:15.

It is advantageous for the process according to the invention if used catalyst is continuously recycled to the hydrogenation mixture. The severity of the hydrogenation is thereby moderated and removal of the sulphonic acid group by hydrogenation is prevented.

In order to make the hydrogenation economical, a total of about 1 to 6% by weight, preferably 3 to 4% by weight, of Raney nickel catalyst, relative to the total weight of the reaction mixture, should be suspended in the solution or suspension to be hydrogenated. In the hydrogenation according to the invention, in each case only as much used catalyst is discharged from the reaction mixture as fresh catalyst is added. Generally, about 1 to 4% by weight, preferably 1.5 to 2% by weight, of fresh catalyst, relative to the weight of the used Raney nickel catalyst, are sufficient.

It is a special characteristic of the process according to the invention that the reactants are brought together in a particular manner and under control of certain parameters. It is essential that a mixture of Raney nickel catalyst, which has already been used in the hydrogenation, and fresh catalyst are initially suspended in water and/or in an aqueous solution of hydrogenated product and an aqueous solution or suspension of nitronaphthalenesulphonic acids is metered into the suspension, at the reaction temperature and under the hydrogen pressure according to the invention, in a manner such that the content in the reaction mixture of nitronaphthalenesulphonic acids and of the intermediate products formed during the hydrogenation, for example hydroxylamines, does not exceed 3% by weight, preferably 1% by weight, relative to the total weight of the reaction mixture and such that the concentration of aminonaphthalenesulphonic acids which is finally reached is about 5 to 40%, preferably 10 to 30% relative to the total weight of the reaction mixture. This procedure is termed pump hydrogenation.

The advantage of the so-called pump hydrogenation is the high yield of aminonaphthalenesulphonic acid. Compared with a so-called batch hydrogenation (all the reactants are combined and the mixture is then heated under a hydrogen pressure), the yields in the pump hydrogenation are up to 10% higher.

It is advantageous for the process according to the invention if some of the hydrogenation product is recycled to the hydrogenation mixture. This has the advantage that the solution or suspension of the nitro compound metered in is greatly diluted a priori, without the additional dilution of the reaction mixture with water. In addition, the hydrogenation product fed back can serve as a transporting agent when the used catalyst is recycled to the hydrogenation mixture.

The process according to the invention is particularly suited to a continuous procedure. However, it can also be carried out discontinuously.

The possibility of carrying out the process according to the invention industrially is illustrated in the following text using the example of an isomer mixture of nitronaphthalenetrisulphonic acids, obtained from the trisulphonation of naphthalene and subsequent nitration of the sulphonation products, whereby the isomer mixture has the composition as indicated herein above for the product according to Fiat Final Report 1016, page 37.

For example, an approximately 10 to 30% strength by weight aqueous solution of nitronaphthalenetrisulphonic acids with a pH value in the range from about 7 to 8 and a temperature of about 90° to 120° C. is metered into an aqueous suspension, which contains about 2 to 5% by weight, relative to the total weight of the reaction mixture, of used Raney nickel catalyst and about 1 to 3% by weight of fresh Raney nickel catalyst, relative to the weight of the used Raney nickel catalyst, at a temperature of about 130° to 160° C. and under a hydrogen pressure of about 150 to 200 bars, in a manner such that the content in the reaction mixture of nitronaphthalenetrisulphonic acids and of the intermediate products formed during the hydrogenation, for example hydroxylamines, does not exceed 3% by weight, preferably 1% by weight relative to the total weight of the reaction mixture. The absorption of hydrogen has ended about 5 to 10 minutes after the metering in of the naphthalenetrisulphonic acid solution has ended.

The isolation of T-acid can be carried out in a manner principally known, for example according to Fiat Final Report 1016, page 37. For example it is possible after cooling of the hydrogenation mixture to about 50° to 80° C., letting down the mixture, filtering off the catalyst and washing the catalyst, to add sodium chloride to the resulting filtrate until the density of the solution is about 1.17. Hydrochloric acid (about 30 to 35% strength by weight) can then stirred into the solution until the first crystals form. Further hydrochloric acid of the same concentration can be added in the course of about 1 to 2 hours, and sodium chloride can then be added to the suspension until the suspension has a density of about 1.19. After cooling to room temperature, the acid salt, which precipitates, of 1-aminonaphthalene-3,6,8-trisulphonic acid is filtered off and washed with aqueous sodium chloride solution and the residue is then dried. When the inventive process is applied to other nitronaphthalenesulphonic acid the working up and isolation of the aminonaphthalenesulphonic acid can be carried out as well in an analogous manner.

The process according to the invention gives yields of aminonaphthalenesulphonic acids of 95 to 99% of theory, relative to the nitro compounds employed. The space/time yields are 1–3 kg of aminonaphthalenesulphonic acids per liter of reactor volume an hour.

The process according to the invention has considerable advantages compared with the processes known from the literature. Thus, the yield of aminonaphthalenesulphonic acids is increased by about 10% by the so-called pump hydrogenation. Only very little fresh catalyst is required for the hydrogenation since the majority of the catalyst consists of recycled used catalyst. By this measure, on the one hand a high catalyst concentration in the hydrogenation mixture is achieved, whereby the rate of hydrogenation is increased, and on the other hand the catalyst costs are substantially lowered. Furthermore, it was surprising that by using used catalyst the degree of catalyst poisoning was reduced to a considerable extent, which contributes to the profitability of the process.

The aminonaphthalenesulphonic acids obtained by the process according to the invention are valuable intermediate products for dyestuffs and dyestuff precursors (compare German Patent specification Nos. 42,874, 67,062, 69,722, 96,083 and 562,513; DT-OS (German Published specification) 2,122,166; British Patent specification Nos. 646,753, 763,064, 785,101, 1,390,706 and 1,429,007; U.S. Pat. Nos. 2,117,707, 2,689,243, 2,779,758, 2,927,449, 3,326,887 and 3,950,128; Japanese Patent Application 17 065/66.

The process according to the invention is described in more detail in the examples which follow. The percentages indicated in the examples denote percentages by weight.

EXAMPLE 1

150 ml of water and 50 g of Raney nickel, which had already been employed for the hydrogenation at least 15 to 20 times, and 1.7 g of fresh Raney nickel are initially introduced into a 2.7 liter V4A autoclave. The autoclave is heated to 130° C. under a hydrogen pressure of about 100 bars, and 1,700 ml (about 2,090 g) of a solution of a nitronaphthalenesulphonic acid isomer mixture (nitro-T-acid isomer mixture) obtained according to Fiat Final Report 1016, page 37 consisting of about 80 to 82% of 1-nitronaphthalene-3,6,8-trisulphonic acid (nitro-T-acid), about 11 to 12% of 1-nitronaphthalene-3,5,7-trisulphonic acid, about 4.5% of 1-nitronaphthalene-4,6,8-trisulphonic acid, about 1.7% of 1-nitronaphthalene-2,5,7-trisulphonic acid, about 1% of 2-nitronaphthalene-3,5,7-trisulphonic acid and about 0.5% 2-nitronaphthalene-4,6,8-trisulphonic acid with a pH value of 7 and a total content of nitro compounds of molecular weight 413 of 20.7% and a temperature of 90° C. are then pumped in the course of 10 minutes. During this procedure, the temperature in the autoclave is kept at 130° to 140° C. and the pressure is kept at 100 to 120 bars. The absorption of hydrogen has ended about 5 minutes after the pumping in has ended. After cooling the autoclave to 80° C. and letting it down and filtering off the catalyst and washing it with water, 2,381 g of a solution are obtained with a total content of aminonaphthalenetrisulphonic acid (molecular weight 383), determined by diazotisation, of 16.3%. Analysis of the solution by high pressure liquid chromatography shows a composition of the amine mixture which corresponds to the isomer distribution in the nitro solution employed; the sum of the contents of the various amino compounds exactly confirms the diazotisation value given above.

Thus the hydrogenation yield is about 97% of theory, which is valid both for the sum of the aminonaphthalenetrisulphonic acids obtained and for the T-acid (1-aminonaphthalene-3,6,8-trisulphonic acid) itself.

About 1 to 2% of the nitro-T-acid isomer mixture employed remain unreduced, as is determined by titanium-III chloride reduction. This unreduced portion is some of the 1-nitronaphthalene-3,5,7-trisulphonic acid, which is difficult to hydrogenate but which can also be reduced after a relatively long time under more drastic hydrogenation conditions. The incomplete reduction of this isomer, which is not useful, is regarded as being insignificant in the further reaction steps.

The T-acid is precipitated as the acid di-sodium salt as follows:

About 120 g of sodium chloride are added, at 55° C., to 1,904 g (about 1,700 ml) of the filtrate, obtained after the catalyst filtration and catalyst washing, until the density of the solution is 1.175. About 35 ml of 30% strength hydrochloric acid are then allowed to run in rapidly at 55° C. until the first crystals form. A further 90 ml of 30% strength hydrochloric acid are added dropwise in the course of one hour and about 230 g of sodium chloride are then added to the suspension until the solution has a density of 1.19.

When this is the case, the solution is cooled to 28° C. and the acid di-sodium salt of the T-acid which has precipitated is isolated on a suction filter. The filter cake is washed with brine (18% strength sodium chloride solution) until it is virtually colourless. The undesired isomers are virtually completely washed out in this manner. The filter cake, which is thoroughly sucked dry, is dried in vacuo at 80° to 90° C. This gives 507.4 g of a dried product, which contains 59.9% of T-acid (molecular weight 383), which is obtained as the acid di-sodium salt tetrahydrate. Thus the isolation yield is about 98% of theory. The dried product contains 110.5 g of sodium chloride and about 0.3 g each of 1-naphthylamino-4,6,8-trisulphonic acid and 1-naphthylamino-3,5,7-trisulphonic acid as impurities.

EXAMPLE 2

A hydrogenation carried out as in Example 1, but under 200 bars, leads to a yield of about 98.5% of theory.

EXAMPLE 3

A hydrogenation carried out as in Example 1, but using Raney nickel/iron (85% nickel, 15% iron) and at a temperature of 150° to 160° C., gave a hydrogenation yield of 96% of theory.

EXAMPLE 4

The hydrogenations are carried out continuously in an installation consisting of three reactors, of internal diameter 350 mm and height 6,500 mm, and an after-reactor, the reactors operating as bubble columns by means of the continuously circulated hydrogen. Due to built-in fitments for heating or cooling, the total reactor operating volume is about 1,300 liter.

8 m$^3$ of the nitronaphthalenesulphonic acid solution, employed in Example 1, with a pH value of 7.5 to 8.0, together with 4 m$^3$ of hydrogenation product solution (solution of the T-acid isomer mixture) are pumped in per hour. The latter carries with it the Raney nickel/iron catalyst, which is filtered off from the main product and is thus continuously recycled, so that a catalyst concentration of about 2 to 5% by weight (relative to the total weight of the reaction mixture) is continuously maintained in the contents of the reactor. In addition, 6 to 7 kg of fresh Raney nickel/iron (85% nickel, 15% iron) is fed into the reactors per hour; a corresponding amount of old catalyst is discharged from the product stream per hour.

12 m$^3$ of a solution consisting of aminonaphthalenesulphonic acid are obtained per hour, one third of which is recycled to the installation, together with the catalyst, whilst two thirds, freed from catalyst, pass to further processing. Thus, per hour, 2.04 tons of nitro compounds employed (molecular weight 413) give, under a hydrogen pressure of 100 to 120 bars and at a temperature of 150° to 160° C., 1.80 to 1.82 tons of aminonaphthalenetrisulphonic acids (molecular weight 383), which corresponds to a yield of 95 to 96% of theory.

EXAMPLE 5

The hydrogenation is carried out as in Example 4, but under a hydrogen pressure of 200 bars. 13 m$^3$ of nitro solution and 6.5 m$^3$ of hydrogenation product solution containing the old catalyst, as well as 13 to 14 kg of fresh Raney nickel/iron are pumped into the installation per hour. The hydrogenation yield is 97 to 98% of theory.

EXAMPLE 6

The hydrogenation is carried out as in Example 1, but under 300 bars. A yield of 99% of theory is obtained.

EXAMPLE 7

The hydrogenation is carried out as in Example 1, but using Raney nickel/iron (85% nickel, 15% iron) and at a temperature of 170° to 180° C. The yield is 94% of theory.

EXAMPLE 8

The hydrogenation is carried out as in Example 1, but a solution of a nitro-T-acid isomer mixture with a pH value of 10 is employed. The yield is 96% of theory.

EXAMPLE 9 (not according to the invention)

The hydrogenation is carried out as in Example 1, but a solution of a nitro-T-acid isomer mixture with a pH value of 11 and a hydrogenation temperature of 170° to 180° C. are chosen. The yield is 89% of theory.

EXAMPLE 10

The hydrogenation is carried out as in Example 1, but 15 g of Raney nickel, which has already been employed for the hydrogenation 15 to 20 times, are initially introduced. The hydrogenation yield is 96% of theory.

EXAMPLE 11

The hydrogenation is carried out as in Example 1, but 1,700 ml (about 1,870 g) of an industrial solution of the ammonium salt of nitro-peri/Laurent acid obtained according to PB Report No. 74197 and treated with ammonium carbonate and chalk followed by filtration of the gypsum which is formed is adjusted to a pH-value of 8.5. The solution with a total content of nitro compounds of molecular weight 223 of 21 to 23% is pumped in. A total amine yield, molecular weight 193, of 96% of theory was obtained.

About 26 to 29% of the total amount of the nitro compounds are 1-nitronaphthalene-5-sulphonic acid (nitro-Laurent acid), about 55 to 58% are 1-nitronaphthalene-8-sulphonic acid (nitro-peri-acid), about 4 to 6% are 1-nitronaphthalene-6-sulphonic acid, about 4 to 6% are 1-nitronaphthalene-7-sulphonic acid and about 1 to 3% are 2-nitronaphthalene-7-sulphonic acid and the like.

EXAMPLE 12

The hydrogenation is carried out as in Example 11, but using Raney nickel/iron (85% nickel, 15% iron). The hydrogenation yield is 97% of theory.

EXAMPLE 13 (not according to the invention)

The hydrogenation is carried out as in Example 2, but using fresh, previously unused catalyst. Pure 1-nitronaphthalene-3,6,8-trisulphonic acid (nitro-T-acid) is employed. 79.5% of 1-aminonaphthalene-3,6,8-trisulphonic acid (T-acid), 13% of 1-aminonaphthalene-3,6-disulphonic acid and 6% of naphthalene-1,3,6-trisulphonic acid are obtained.

EXAMPLE 14

The hydrogenation is carried out as in Example 2, but 1,900 g of a suspension of the disodium salt of 3-nitronaphthalene-1,5-disulphonic acid (some of the disulphonic acid is present in solution) with a pH value of 7 and a total content of nitro compound of molecular weight 333 of 20 to 30% are pumped in.

The disodium salt of 3-amino-1,5-disulphonic acid present after the hydrogenation is soluble in water from 70° C. in the resulting concentration range. After the catalyst filtration, the hydrogenated solution is concentrated to dryness. The total amine yield, molecular weight 303, is 99% of theory.

3-Nitronaphthalene-1,5-disulphonic acid is prepared according to German Pat. No. 65,997 (1890) from pure naphthalene-1,5-disulphonic acid. The disodium salt of 3-nitronaphthalene-1,5-disulphonic acid is precipitated by adding sodium carbonate to the nitration mixture in solution in sulphuric acid, which has been diluted with water, is filtered off and washed with sodium chloride solution. Before being employed in the hydrogenation, the suspension of the disodium salt of 3-nitronaphthalene-1,5-disulphonic acid is adjusted to pH=7 with sodium carbonate or sodium bicarbonate.

EXAMPLE 15

The hydrogenation is carried out as in Example 14, but a suspension of the magnesium salt of 3-nitronaphthalene-1,5-disulphonic acid is pumped in instead of the disodium salt. In this case, however, after the hydrogenation has ended and after the catalyst filtration and before the evaporation, the solution of the magnesium salt of 3-aminonaphthalene-1,5-disulphonic acid (C-acid) is converted into the solution of the disodium salt by adding sodium carbonate. Magnesium carbonate precipitates and is filtered off.

The total amine yield, molecular weight 303, is 99% of theory.

The magnesium salt of 3-nitronaphthalene-1,5-disulphonic acid is precipitated in a manner similar to the disodium salt by adding magnesium carbonate or magnesium oxide to the nitration mixture in solution in sulphuric acid, diluted with water, is filtered off and washed with sodium chloride solution. Before being employed in the hydrogenation, the suspension of the magnesium salt of 3-nitronaphthalene-1,5-disulphonic is adjusted to pH=7 as indicated in Example 14.

What is claimed is:

1. Process for the preparation of an aminonaphthalene-sulphonic acid by the catalytic hydrogenation of salts of nitronaphthalene-sulphonic acids, with hydrogen in the presence of a Raney nickel catalyst at elevated temperature and under elevated pressure, characterized in that a mixture of Raney nickel catalyst which has already been used in the hydrogenation and fresh Raney nickel catalyst is initially suspended in water and/or an aqueous solution of hydrogenated product, this suspension is heated to a temperature of about 100° to 180° C. under a hydrogen pressure of about 100 to 300 bars and an aqueous solution or suspension of nitronaphthalene-sulphonic acid salts with a pH value in the range from 6 to 9 is metered into the suspension containing water at this temperature in a manner such that the content of nitronaphthalene-sulphonic acid in the reaction mixture does not exceed 3%, relative to the total weight of the reaction mixture and such that the concentration of aminonaphthalene-sulphonic acids which is finally reached is about 5 to 40% relative to the total weight of the reaction mixture.

2. Process according to claim 1 wherein a mixture of nitronaphthalene sulphonic acids is hydrogenated.

3. Process according to claim 2 wherein the mixture of nitronaphthalene sulphonic acids contains a major amount of 1-nitronaphthalene-3,6,8-trisulphonic acid.

4. Process according to claim 3 wherein 1-nitronaphthalene-3,6,8-trisulphonic acid is present in an amount of about 80 to 82% by weight of an isomeric mixture.

5. Process according to claim 1 wherein the nitronaphthalene sulphonic acid is a 1-nitronaphthalene-3,6,8-trisulphonic acid.

6. Process according to claim 1 wherein the nitronaphthalene sulphonic acid is a mixture of 5- and 8-nitronaphthalene-1-sulphonic acids.

7. Process according to claim 1 wherein the nitronaphthalene sulphonic acid is 3-nitronaphthalene-1,5-disulphonic acid.

8. Process according to claim 1, characterized in that used Raney nickel catalyst is continuously recycled to the reaction mixture.

9. Process according to claim 1, characterized in that the amount of Raney nickel catalyst in the suspension is about 1 to 6% by weight, relative to the total weight of the reaction mixture.

10. Process according to claim 1, characterized in that the amount of fresh Raney nickel catalyst is about 1 to 4% by weight, relative to the weight of the used Raney nickel catalyst.

11. Process according to claim 1, characterized in that the hydrogenation is carried out continuously.

12. Process according to claim 1, characterized in that the sodium, potassium, ammonium, magnesium and/or calcium salts of the nitronaphthalenesulphonic acids are employed.

13. Process according to claim 1, characterized in that a member selected from the group consisting of 1-nitronaphthalene-5-sulphonic acid, 1-nitronaphthalene-8-sulphonic acid, 3-nitronaphthalene-1,5-disulphonic acid, 1-nitronaphthalene-4,8-disulphonic acid, 1-nitronaphthalene-3,8-disulphonic acid, 1-nitronaphthalene-3,6,8-trisulphonic acid, 1-nitronaphthalene-4,6,8-trisulphonic acid and 1-nitronaphthalene-3,5,7-trisulphonic acid or a mixture of said sulphonic acids are employed as the nitronaphthalenesulphonic acids.

14. Process according to claim 1, characterized in that as nitronaphthalenesulphonic acids a mixture is used containing about 80 to 82% by weight of 1-nitronaphthalene-3,6,8-trisulphonic acid (nitro-T-acid), about 11 to 12% by weight of 1-nitro-naphthalene-3,5,7-trisulphonic acid, about 4.5% by weight of 1-nitro-naphthalene-4,6,8-trisulphonic acid, about 1.7% by weight of 1-nitro-naphthalene-2,5,7-trisulphonic acid, about 1% by weight of 2-nitro-naphthalene-3,5,7-trisulphonic acid and about 0.5% by weight of 2-nitronaphthalene-4,6,8-trisulphonic acid.

15. Process according to claim 1, characterized in that the hydrogenation is carried out in water.

16. Process according to claim 1, characterized in that the hydrogenation is carried out in a water/alcohol mixture, the weight ratio of water to alcohol being 1:2 to 2:1.

17. Process according to claim 1, characterized in that the hydrogenation is carried out at a pH value of 7 to 8.

18. Process according to claim 1, characterized in that the concentration of aminosulphonic acids which is finally reacted is 10 to 30% based on the total weight of the reaction mixture.

* * * * *